(12) United States Patent
Kim

(10) Patent No.: US 12,225,617 B2
(45) Date of Patent: Feb. 11, 2025

(54) METHOD AND APPARATUS FOR RESUME PROCEDURE FOR DATA TRANSFER IN RRC_INACTIVE STATE IN MOBILE WIRELESS COMMUNICATION SYSTEM

(71) Applicant: BLACKPIN INC., Seoul (KR)

(72) Inventor: Soenghun Kim, Gyeonggi-do (KR)

(73) Assignees: BLACKPIN INC., Seoul (KR); Soenghun Kim, Gyeonggi-do (KR)

( * ) Notice: Subject to any disclaimer, the term of this patent is extended or adjusted under 35 U.S.C. 154(b) by 0 days.

(21) Appl. No.: 18/381,642

(22) Filed: Oct. 19, 2023

(65) Prior Publication Data

US 2024/0049338 A1    Feb. 8, 2024

Related U.S. Application Data

(63) Continuation of application No. 18/122,138, filed on Mar. 16, 2023, now Pat. No. 11,832,333, which is a
(Continued)

(30) Foreign Application Priority Data

Aug. 18, 2021 (KR) .................. 10-2021-0108996

(51) Int. Cl.
*H04W 76/27* (2018.01)
*H04W 12/03* (2021.01)
(Continued)

(52) U.S. Cl.
CPC .......... *H04W 76/27* (2018.02); *H04W 12/03* (2021.01); *H04W 12/041* (2021.01);
(Continued)

(58) Field of Classification Search
CPC ..... H04W 76/27; H04W 76/30; H04W 72/23; H04W 76/19; H04W 74/0833;
(Continued)

(56) References Cited

U.S. PATENT DOCUMENTS

| 2023/0189380 A1* | 6/2023 | Palat ..................... H04W 76/11 370/329 |
| 2023/0284329 A1* | 9/2023 | Agiwal ................. H04W 76/27 370/331 |
| 2023/0380003 A1* | 11/2023 | Agiwal ................. H04W 76/19 |

FOREIGN PATENT DOCUMENTS

KR    10-2018-0081436 A    7/2018

OTHER PUBLICATIONS

3rd Generation Partnership Project; Technical Specification Group Radio Access Network; NR;User Equipment (UE) radio access capabilities (Release 16), 3GPP TS 38.306 V16.4.0, Mar. 2021.
(Continued)

*Primary Examiner* — Nam T Huynh
(74) *Attorney, Agent, or Firm* — Nicholas Park

(57) ABSTRACT

A method and apparatus for data transfer in RRC_INACTIVE state is provided. Method for data transfer in RRC_INACTIVE state includes receiving a RRCRelease, determining a radio bearer configured for second resume procedure based on the first information for second resume procedure, receiving from the base station a system information, initiating second resume procedure, restoring configuration of the radio bearer configured for second resume procedure stored in UE Inactive AS context, re-establishing PDCP entity of the radio bearer configured for second resume procedure, resuming the radio bearer configured for second resume procedure and transmitting to the base station a RRCResumeRequest.

14 Claims, 14 Drawing Sheets

Related U.S. Application Data continuation of application No. PCT/KR2022/011385, filed on Aug. 2, 2022.

(51) Int. Cl.

| | | |
|---|---|---|
| *H04W 12/041* | (2021.01) | |
| *H04W 76/19* | (2018.01) | |
| *H04W 76/30* | (2018.01) | |
| *H04W 72/231* | (2023.01) | |
| *H04W 74/0833* | (2024.01) | |

(52) U.S. Cl.
CPC ........... *H04W 76/19* (2018.02); *H04W 76/30* (2018.02); *H04W 72/231* (2023.01); *H04W 74/0833* (2013.01)

(58) Field of Classification Search
CPC . H04W 12/03; H04W 12/037; H04W 12/041; H04W 12/10; H04W 72/231; H04W 48/20
See application file for complete search history.

(56) References Cited

OTHER PUBLICATIONS

3rd Generation Partnership Project; Technical Specification Group Radio Access Network; NR;Medium Access Control (MAC) protocol specification (Release 16), 3GPP TS 38.321 V16.5.0, Jun. 2021.
3rd Generation Partnership Project; Technical Specification Group Radio Access Network; NR;Packet Data Convergence Protocol (PDCP) specification (Release 16), 3GPP TS 38.323 V16.4.0. Jun. 2021.
3rd Generation Partnership Project; Technical Specification Group Radio Access Network;NR;Radio Resource Control (RRC) protocol specification (Releas 16), 3GPP TS 38,331 V16.5.0, Jun. 2021.
Vivo, Further Discussion on User Plane Aspect of Small Data Transmission, R2-2104760, 3GPP TSG-RAN WG2 Meeting #114-e, May 11, 2021.
OPPO, Discussion on common user plane issues of SDT, R2-2104770, 3GPP TSG-RAN WG2 Meeting #114-e, May 11, 2021.
OPPO, Discussion on RACH-based SDT, R2-2104772, 3GPP TSG-RAN WG2 Meeting #114-e, May 11, 2021.
Samsung, User Plane Common Aspects of RACH and CG based SDT, R2-2104784, 3GPP TSG-RAN2 Meeting #114-e, May 10, 2021.
Samsung, Control Plane Common Aspects of RACH and CG based SDT, R2-2104785, 3GPP TSG-RAN2 Meeting #114-e, May 10, 2021.
Samsung, Details of RACH based Small Data Transmission, R2-2104786, 3GPP TSG-RAN2 Meeting #114-e, May 10, 2021.
Intel Corporation, CP-SDT remaining open issues, R2-2104882, 3GPP TSG RAN WG2 Meeting #114-e, May 11, 2021.
Intel Corporation, RA-SDT remaining open issues, R2-2104883, 3GPP TSG RAN WG2 Meeting #114-e, May 11, 2021.
Huawei, HiSilicon, Running MAC CR for Small Data, R2-2105032, 3GPP TSG-RAN2 Meeting #114-e, May 11, 2021.
Apple, Control plane aspects on the SDT procedure, R2-2105101, 3GPP TSG-RAN WG2 Meeting #114 bis electronic, May 11, 2021.
Huawei, HiSilicon, Small data transmission with RA-based schemes, R2-2105574, 3GPP TSG-RAN WG2 #114-e, May 11, 2021.
Huawei, HiSilicon, Control plane common aspects for SDT, R2-2105575, 3GPP TSG-RAN WG2 #114-e, May 11, 2021.
Ericsson, RACH based small data transmission, R2-2105758, 3GPP TSG-RAN WG2 #114-e, May 10, 2021.
Ericsson, Common aspects for SDT, R2-2105760, 3GPP TSG-RAN WG2 #114-e, May 10, 2021.
Nokia, Nokia Shanghai Bell, Details of RACH specific schemes, R2-2105878, 3GPP TSG-RAN WG2 Meeting #114 Electronic, May 11, 2021.
Qualcomm Incorporated, Discussion on open issues of SDT, R2-2105885, 3GPP TSG-RAN WG2 Meeting #114 electronic, May 11, 2021.
Qualcomm Incorporated, Discussion on open issues for RACH based SDT, R2-2105886, 3GPP TSG-RAN WG2 Meeting #114 electronic, May 11, 2021.
ZTE Coroporation (rapporteur), Introduction of SDT, R2-2105927, 3GPP TSG-RAN WG2 Meeting #114e, May 10, 2021.
InterDigital, User plane aspects of small data transmission, R2-2106043, 3GPP RAN WG2 Meeting #114e, May 10, 2021.

\* cited by examiner

User Plane Protocol Stack

Control Plane Protocol Stack

METHOD AND APPARATUS FOR RESUME PROCEDURE FOR DATA TRANSFER IN RRC_INACTIVE STATE IN MOBILE WIRELESS COMMUNICATION SYSTEM

CROSS-REFERENCE TO RELATED APPLICATION

This application is a Continuation Application of U.S. patent application Ser. No. 18/122,138, filed on Mar. 16, 2023, now U.S. Pat. No. 11,832,333, which is a US Bypass Continuation Application of International Application No. PCT/KR2022/011385, filed on Aug. 2, 2022, which claims priority to and the benefit of Korean Patent Application No. 10-2021-0108996, filed on Aug. 18, 2021, the disclosure of which is incorporated herein by reference in its entirety.

BACKGROUND

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

SUMMARY

Aspects of the present disclosure are to address the problems of state transition from RRC_INACTIVE to RRC_CONNECTED for data transfer. Accordingly, an aspect of the present disclosure is to provide a method and an apparatus for data transfer in RRC_INACTIVE state. In accordance with an aspect of the present disclosure, a method of a terminal in mobile communication system is provided. The method comprises receiving a RRCRelease, determining a radio bearer configured for second resume procedure based on the first information for second resume procedure, receiving from the base station a system information, initiating second resume procedure, restoring configuration of the radio bearer configured for second resume procedure stored in UE Inactive AS context, re-establishing PDCP entity of the radio bearer configured for second resume procedure, resuming the radio bearer configured for second resume procedure and transmitting to the base station a RRCResumeRequest.

DETAILED DESCRIPTION

Figure 1A:
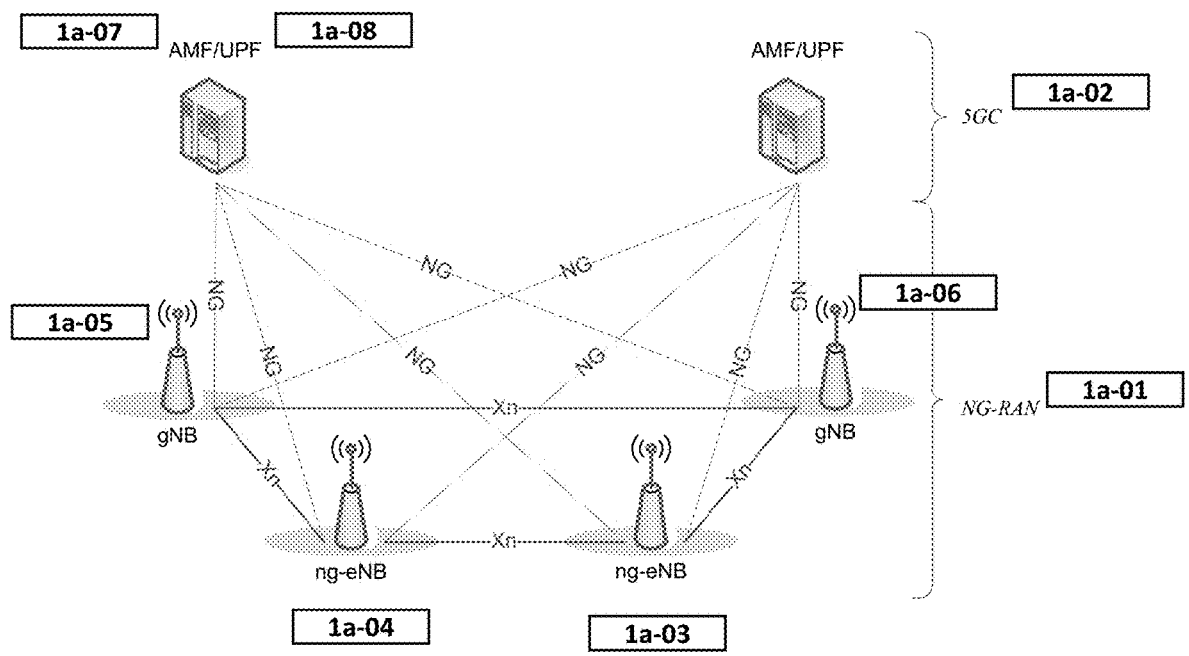
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name |
|---|---|
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |

TABLE 1-continued

| Acronym | Full name |
|---|---|
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |

Table 2 lists the terminologies and their definition used throughout the present disclosure.

TABLE 2

| Terminology | Definition |
|---|---|
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| allowedSCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| allowed Serving Cells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| discard Timer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code—Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| Logical Channel Config | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logical Channel Group | ID of the logical channel group, as specified in TS 38.321, which the logical channel belongs to |

TABLE 2-continued

| Terminology | Definition |
| --- | --- |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity re-establishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH SCell | a Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggy-backed NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG) EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply The cell is part of either the selected PLMN or the registered PLMN or PLMN of the Equivalent PLMN list The cell is not barred The cell is part of at least one TA that is not part of the list of "Forbidden Tracking Areas for Roaming" (TS 22.011 [18]), which belongs to a PLMN that fulfils the first bullet above. The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UE Inactive | UE Inactive AS Context is stored when the connection is suspended and restored when the connection is resumed. It includes information below. |
| AS Context | the current KgNB and KRRCint keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured) and all other parameters configured except for: parameters within ReconfigurationWithSync of the PCell; parameters within ReconfigurationWithSync of the NR PSCell, if configured; parameters within MobilityControlInfoSCG of the E-UTRA PSCell, if configured; servingCellConfigCommonSIB; |

In the present invention, "trigger" or "triggered" and "initiate" or "initiated" may be used in the same meaning.

In the present invention, "radio bearers allowed for the second resume procedure", "radio bearers for which the second resume procedure is set", and "radio bearers for which the second resume procedure is enabled" may all have the same meaning.

FIG. 1A is a diagram illustrating the architecture of an 5G system and a NG-RAN to which the disclosure may be applied.

5G system consists of NG-RAN 1a-01 and 5GC 1a-02. An NG-RAN node is either:

A gNB, providing NR user plane and control plane protocol terminations towards the UE; or An ng-eNB, providing E-UTRA user plane and control plane protocol terminations towards the UE.

The gNBs 1a-05 or 1a-06 and ng-eNBs 1a-03 or 1a-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1a-07 and UPF 1a-08 may be realized as a physical node or as separate physical nodes.

A gNB 1a-05 or 1a-06 or an ng-eNBs 1a-03 or 1a-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1a-07 hosts the functions such as NAS signaling, NAS signaling security, AS security control, SMF selection, Authentication, Mobility management and positioning management.

The UPF 1a-08 hosts the functions such as packet routing and forwarding, transport level packet marking in the uplink, QoS handling and the downlink, mobility anchoring for mobility etc.

Figure 1B:
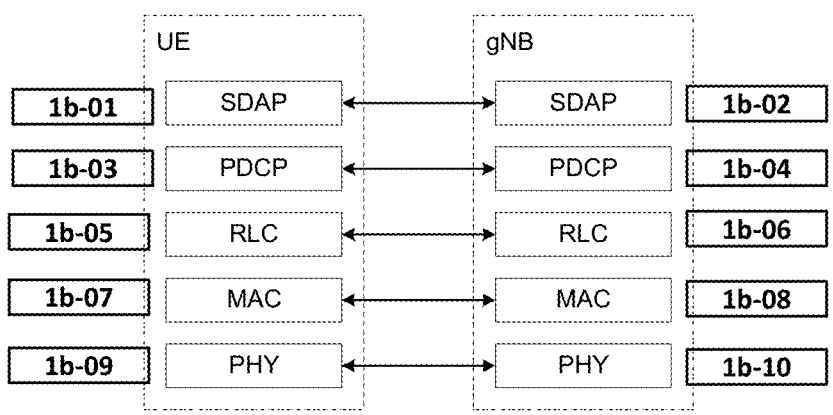
FIG. 1B is a diagram illustrating a wireless protocol architecture in an 5G system to which the disclosure may be applied.
Figure 1B:
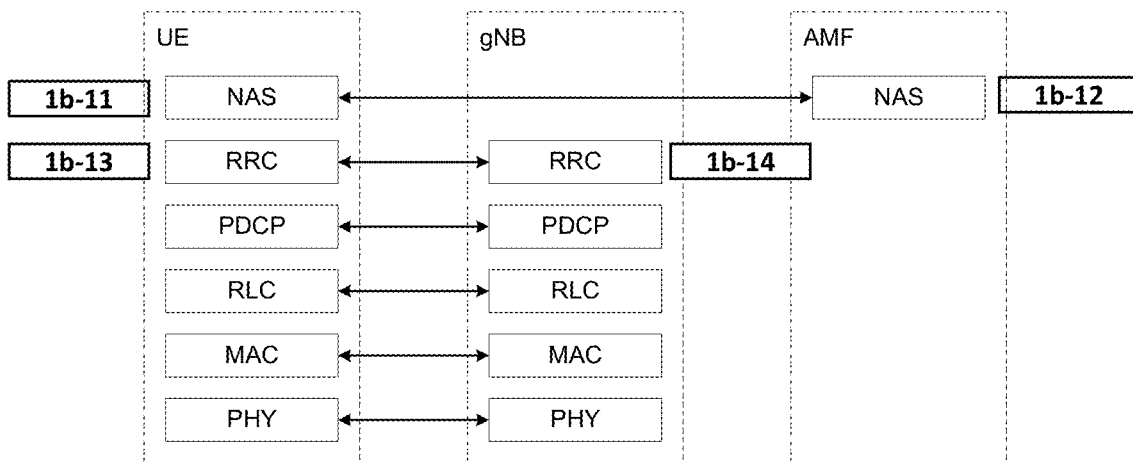

FIG. 1B is a diagram illustrating a wireless protocol architecture in an 5G system to which the disclosure may be applied.

User plane protocol stack consists of SDAP 1b-01 or 1b-02, PDCP 1b-03 or 1b-04, RLC 1b-05 or 1b-06, MAC 1b-07 or 1b-08 and PHY 1b-09 or 1b-10. Control plane protocol stack consists of NAS 1b-11 or 1b-11b-, RRC 1b-13 or 1b-14, PDCP, RLC, MAC and PHY.

Each protocol sublayer performs functions related to the operations listed in the Table 3.

TABLE 3

| Sublayer | Functions |
| --- | --- |
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking Qos flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |

TABLE 3-continued

| Sublayer | Functions |
| --- | --- |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
| --- | --- |
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection; Broadcast of system information; Cell re-selection mobility; Paging is initiated by NG-RAN (RAN paging); RAN-based notification area (RNA) is managed by NG-RAN; DRX for RAN paging configured by NG-RAN; 5GC-NG-RAN connection (both C/U-planes) is established for UE; The UE AS context is stored in NG-RAN and the UE; NG-RAN knows the RNA which the UE belongs to. |
| RRC_CONNECTED | 5GC-NG-RAN connection (both C/U-planes) is established for UE; The UE AS context is stored in NG-RAN and the UE; NG-RAN knows the cell which the UE belongs to; Transfer of unicast data to/from the UE; Network controlled mobility including measurements. |

Figure 1C:
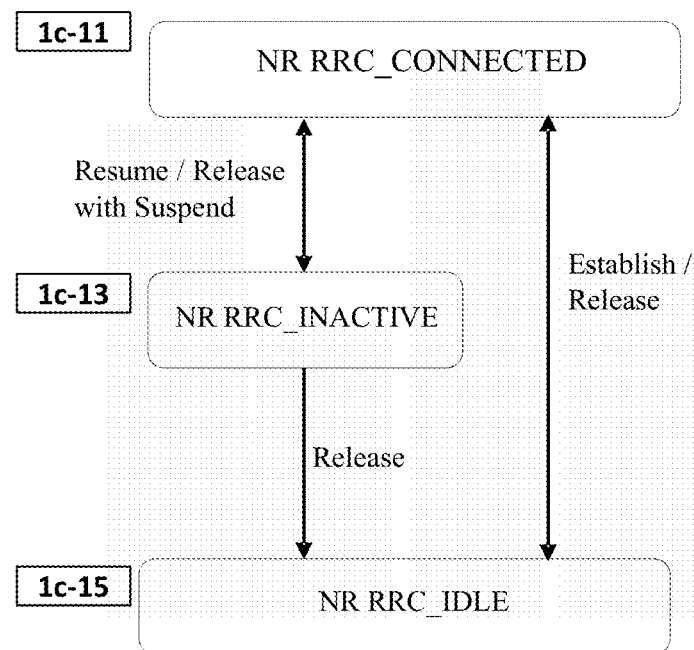
FIG. 1C is a diagram illustrating an RRC state transition.

FIG. 1C is a diagram illustrating an RRC state transition.

Between RRC_CONNECTED 1c-11 and RRC_INACTIVE 1c-13, a state transition occurs due to the exchange of the Resume message and the Release message containing the Suspend IE.

A state transition occurs between RRC_CONNECTED 1c-11 and RRC_IDLE 1c-15 through RRC connection establishment and RRC connection release.

The state transition from RRC_INACTIVE to RRC_CONNECTED involves not only signal exchange between the terminal and the base station, but also context transfer and data path change between the base stations. If the terminal has enough data to transmit, these additional procedures can be sufficiently justified, but if not, excessive overhead can reduce the efficiency of the network.

The present invention introduces a new resumption procedure capable of transmitting and receiving data without transition to RRC_CONNECTED. Hereinafter, a resume procedure for the purpose of transitioning the terminal to the RRC_CONNECTED state from the RRC_INACTIVE state is referred as to a first resume procedure, and a procedure for transmitting and receiving data while the terminal is in the RRC_INACTIVE state is referred to as a second resume procedure. Through the first resume procedure, the terminal may resume the suspended RRC connection, and through the second resume procedure, the terminal may resume data transmission and reception. The terminal may switch to the first resume procedure while performing the second resume procedure.

Figure 2A:
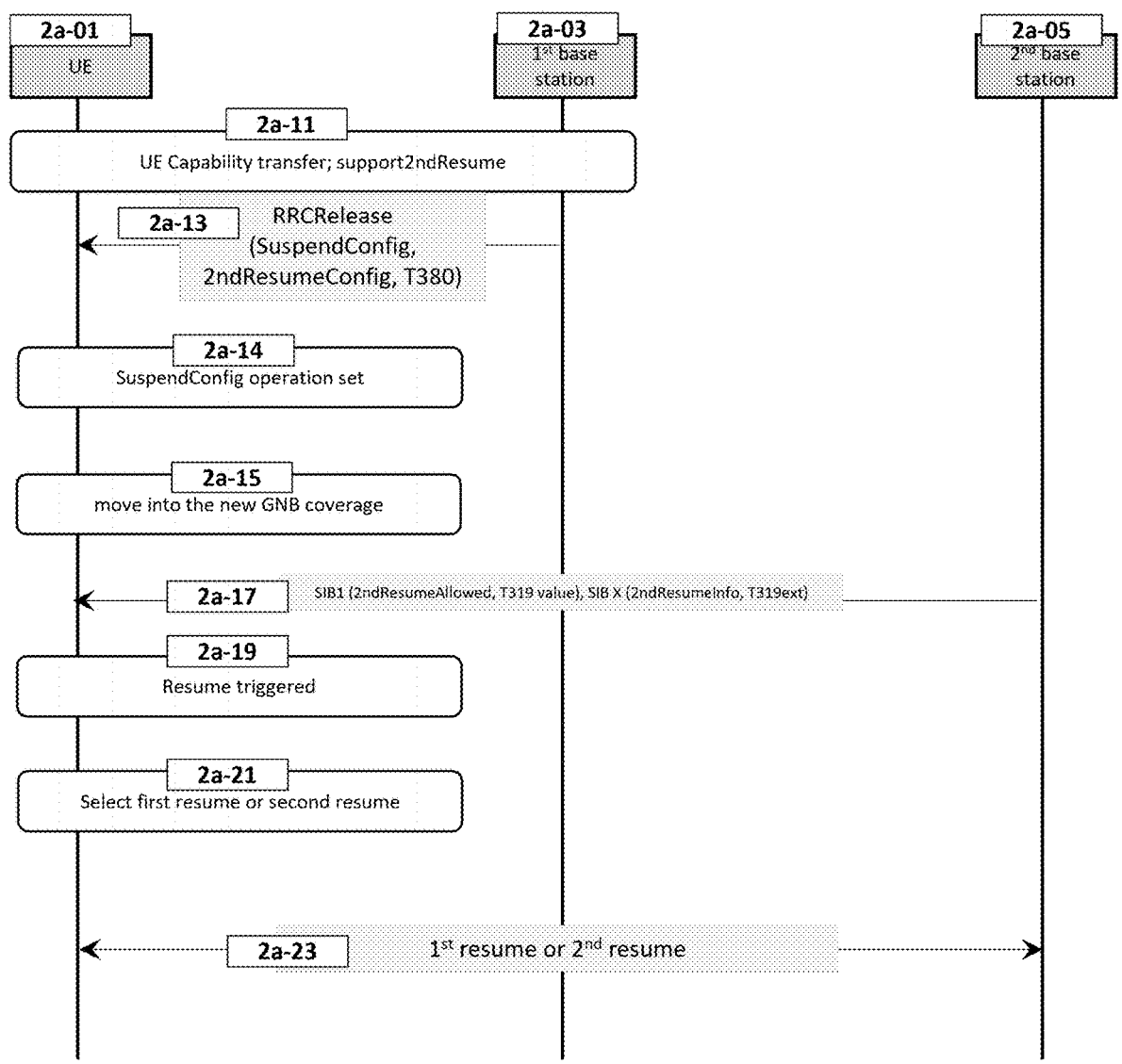
FIG. 2A is a diagram illustrating operations of a terminal and a base station according to an embodiment of the present invention.

FIG. 2A is a diagram illustrating operations of a terminal and a base station according to an embodiment of the present invention.

In a wireless communication system including a terminal 2a-01, a first base station 2a-03, and a second base station 2a-05, the terminal and the base station operate as follows.

In steps 2a-11, the terminal reports capability to the first base station or another base station. The UE capability information transfer procedure consists of transmitting an RRC control message called UECapabilityInformation containing UE capability information to the serving base station if the serving base station transmits an RRC message requesting UE capability information. UECapabilityInformation includes the following information.

<UECapabilityInformation>

1. First information related to RRC_INACTIVE: 1-bit information indicating whether the terminal supports RRC_INACTIVE. Only one 1-bit is reported regardless of the number of bands supported by the terminal.

2. Second information related to RRC_INACTIVE: information indicating whether the second resume procedure is supported or not. It may indicate whether the second resume procedure is supported for each band supported by the terminal. When the terminal supports n bands, n 1-bit information is reported.

3. Various pieces of capability information related to data transmission/reception between the terminal and the base station (for example, whether specific decoding is supported, etc.).

The terminal supporting RRC_INACTIVE supports the first resume procedure in all frequency bands supported by the terminal. That is, the first information related to RRC_INACTIVE support is information applied to a plurality of bands, and the second information related to RRC_INACTIVE is information applied to one band. A terminal that does not support RRC_INACTIVE does not support the second resume procedure in any frequency band that it supports. The serving base station provides appropriate NR configuration information to the UE by referring to the capability of the UE. The UE and the serving base station transmit and receive data in the RRC_CONNECTED state, and when the data transmission and reception are completed, the serving base station determines to transition the terminal state to the RRC_INACTIVE state.

In step 2a-13, the first base station transmits an RRCRelease message to the terminal. The RRCRelease message includes SuspendConfig IE, and SuspendConfig includes the following information.

<SuspendConfig>

1. The first terminal identifier: an identifier of a terminal that may be included in the ResumeRequest when a state transition to RRC_CONNECTED is made. It has a 40-bit length.

2. The second terminal identifier: an identifier of a terminal that may be included in the Resume Request when a state transition to RRC_CONNECTED is made. It has a 24-bit length.

3. ran-Paging Cycle: Paging cycle to be applied in RRC_INACTIVE state.

4. ran-Notification AreaInfo: Configuration information of a ran-Notification Area consisting of a list of cells and the like. The terminal initiates a resume procedure when the ran_Notification Area is changed.

5. t380: Timer related to the periodic resumption procedure.

6. NextHopChangingCount (NCC): Counter used to derive new security keys after performing the resume procedure.

7. Second resume procedure related information: List of DRBs configured with second resume procedures, 1-bit information indicating whether the second resume procedure is configured for SRB2, 1-bit information indicating whether the second resume procedure is configured for SRB4, Data size threshold of the second resume procedure (hereinafter referred to as dedicated data threshold), reference signal received power threshold of the second resume procedure (hereinafter referred to as dedicated reference signal received power threshold)

Since SRB1 among SRB1, SRB2, SRB3, and SRB4 transmits and receives the most important RRC control message, it is important to quickly transmit the RRC control message as the second resume procedure, and the second resume procedure is highly effective for SRB1. SRB2 and SRB4 are less important than SRB1 because relatively large messages can occur, but they still transmit important control messages, so the second resume procedure is effective for SRB2 and SRB4. SRB3 is not used when multiple connections are not established. Accordingly, in the present invention, a second resume procedure can be explicitly configured for SRB2 and SRB4. A second resume procedure is not explicitly configured for SRB1 and SRB3. If a second resume procedure is configured for at least one radio bearer, a second resume procedure is implicitly configured for SRB1. A second resume procedure is not configured for SRB3 under any conditions.

In step 2a-14, the terminal performs the SuspendConfig operation set. The SuspendConfig operation set is applied at a predetermined first or second time point. For the SuspendConfig operation set is performed, the following operations are sequentially performed.

<SuspendConfig Operation Set>

1. Apply suspendConfig.
2. Reset MAC.
3. Reset SRB1's RLC entity.
4. All SRBs and DRBs are suspended.
5. Start T380 set to t380.
6. Enter RRC_INACTIVE state.

The terminal applies the first time point for SuspendConfig operation set when the second resume related information is included, and the second time point if not included.

The first time point is as follows.

Earlier time point between a time point at which 100 ms has elapsed since receiving the RRCRelease message and a time point at which the lower layer successfully acknowledged the reception of the RRCRelease message.

The second time point is as follows.

Earlier time point between a time point at which 60 ms has elapsed since receiving the RRCRelease message and a time point at which the lower layer successfully acknowledged the reception of the RRCRelease message.

Different time points are used because the reliability of the RRC Release message including the second resume-related information should be higher than that of the RRC Release message not including the second resume information.

In step 2a-15, the terminal moves to a new cell. The terminal may compare the radio signal quality of the serving cell and the neighboring cell to reselect the neighboring cell having a better radio signal quality. Alternatively, a cell in which the radio signal quality is greater than or equal to a certain threshold may be selected.

In steps 2a-17, the terminal receives system information including SIB1 in a new cell. The SIB1 may include at least two types of information below.

<SIB1>

1. The value of t319
2. 1-bit information indicating whether the second resume procedure is allowed (or whether the second resume procedure is configured or possible).

If the second resume procedure is allowed, the following information is included and broadcast in system information (hereinafter, SIBX) other than SIB1.

<SIBX>

1. Data size threshold of the second resume procedure (hereinafter, referred to as public data threshold)
2. Reference signal received power threshold of the second resume procedure (hereinafter, referred to as a common reference signal received power threshold)
3. Random access transmission resource information for the second resume procedure.
4. t319ext The terminal receives the SIBX if there is at least one radio bearer configured with a second resume procedure, i.e., if the second resume procedure is configured for at least one DRB or if the second resume procedure is configured for SRB2 or SRB4.

The terminal receiving the necessary system information including SIB1 performs the RRC_INACTIVE operation shown in Table 4 in the cell.

In step 2a-19, an event that triggers the resume procedure occurs. When the upper layer or AS requests the resumption of the suspended RRC connection or when new data occurs, the resume procedure may be triggered.

In step 2a-21, the terminal triggers one of the first resume procedure and the second resume procedure. If any condition of the first resume condition group is satisfied, the first resume procedure is triggered.

<First Resume Condition Group>

1. The upper layer requests the resumption of the suspended RRC connection.
2. RAN paging including the first identifier is received.
3. RNA update occurs.
4. Data has been generated in the radio bearer that is allowed to trigger the second resume procedure, but at least one of the second resume condition group is not satisfied.

If all conditions of the second resume condition group are satisfied, the second resume procedure is triggered.

<Second Resume Condition Group>

1. Data available for transmission is generated in a bearer belonging to the first bearer set.
2. The amount of data available for transmission from the bearer belonging to the first bearer set is less than the final data threshold.
3. The reference signal received power of the current serving cell is higher than the final reference signal received power threshold.
4. The current serving cell provides transmission resource for the second resume procedure.

A radio bearer that triggering second resume procedure is allowed (or a second resume procedure is allowed) means DRB that a second resume procedure is allowed and SRB a second resume procedure is allowed. The second resume procedure is not allowed for SRB3, and SRB2 and SRB4 are indicated by explicit information whether the second resume procedure is allowed. When the second resume procedure is allowed in at least one radio bearer, the second resume procedure is automatically allowed in the SRB1.

The final data threshold is the lower of the dedicated data threshold and the common data threshold or alternatively the dedicated data threshold, if there are both dedicated data thresholds and common data thresholds. If there is only one, it is the final data threshold. Alternatively, if there are both dedicated data thresholds and common data thresholds, the common data threshold is the final data threshold, and if there is only one, it is the final data threshold.

The final reference signal received power threshold is a higher of the dedicated reference signal received power threshold and the common reference signal received power threshold or the dedicated reference signal received power threshold, if there are both dedicated reference signal received power threshold and common reference signal received power threshold. If there is only one, it is the final data threshold. Or, if there are both dedicated reference signal received power threshold and common reference signal received power threshold, the common reference signal received power threshold is the final reference signal received power threshold, and if there is only one, it is the final data threshold.

When at least one of the first condition group is satisfied and all of the second condition group are satisfied, that is, when both the first resume procedure and the second resume procedure are triggered, the terminal selects the second resume procedure.

In step 2a-23, the terminal performs a first resume procedure or a second resume procedure with the base station.

Figure 2B:
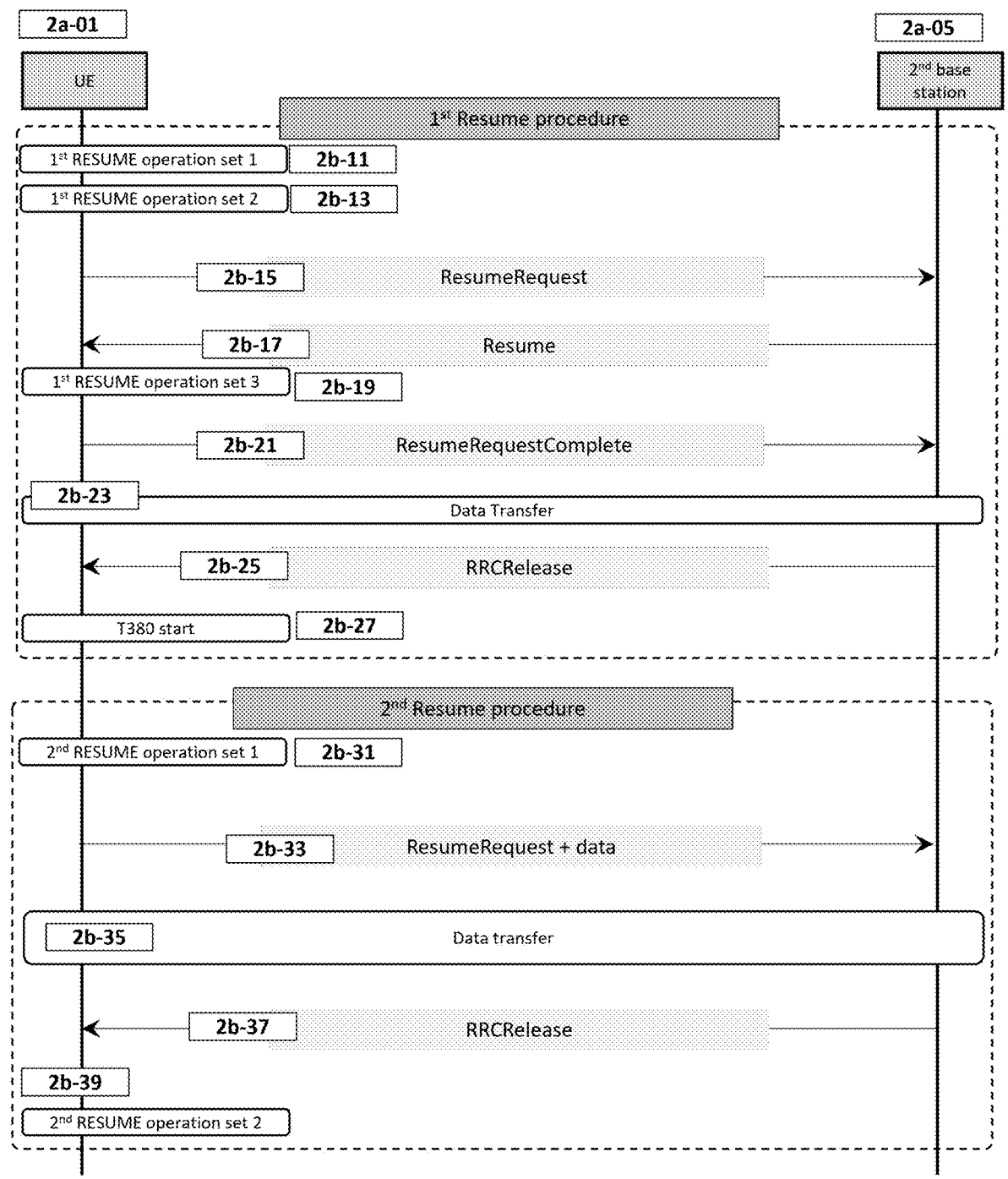
FIG. 2B is a diagram illustrating a first resume procedure and a second resume procedure according to an embodiment of the present invention.

FIG. 2B is a diagram illustrating a first resume procedure and a second resume procedure according to an embodiment of the present invention.

The first resume procedure is as follows.

In step 2b-11, the terminal performs the first resume operation set 1. The first resume operation set 1 is operations taken when the first resume procedure is started, and as follows. By performing the first operation set 1, the terminal may receive a downlink control message from the base station via SRB1.

<First Resume Operation Set 1>

1. Apply default SRB1 configuration.
2. Apply default MAC Cell Group configuration
3. Start T319 set to t319 received from SIB1.

The default SRB1 configuration is as follows.

TABLE 5

| Name | Value | | |
|---|---|---|---|
| | SRB1 | SRB2 | SRB3 |
| PDCP-Config | | | |
| >t-Reordering | | infinity | |
| RLC-Config CHOICE | | Am | |
| ul-AM-RLC | | | |
| >sn-FieldLength | | size12 | |
| >t-PollRetransmit | | ms45 | |
| >pollPDU | | infinity | |
| >pollByte | | infinity | |
| >maxRetxThreshold | | t8 | |
| dl-AM-RLC > | | size12 | |
| sn-FieldLength | | | |
| >t-Reassembly | | ms35 | |
| >t-StatusProhibit | | ms0 | |
| logicalChannelIdentity | 1 | 2 | 3 |
| LogicalChannelConfig | | | |
| >priority | 1 | 3 | 1 |
| >prioritisedBitRate | | infinity | |
| >logicalChannelGroup | | 0 | |

The default MAC Cell Group configuration is as follows.

TABLE 6

| Name | Value |
|---|---|
| MAC Cell Group configuration | |
| bsr-Config | |
| >periodicBSR-Timer | sf10 |
| >retxBSR-Timer | sf80 |
| phr-Config | |
| >phr-PeriodicTimer | sf10 |
| >phr-ProhibitTimer | sf10 |
| >phr-Tx-PowerFactorChange | dB1 |

T319 set to t319 is a timer to perform follow-up measures, for example, transition to RRC_IDLE, etc., when the first resume procedure fails. T319 set to t319 is stopped when RRCResume is received. If the RRCResume is not received until the T319 set to t319 expires, the terminal performs the T319 expiration operation set.

<T319 Expiration Operation Set>
1. Reset MAC.
2. Discard UE Inactive AS Context.
3. Release suspendConfig.
4. Discard the security key.
5. Release all RLC entities, PDCP entities, and SDAP entities.
6. Transition to RRC_IDLE and perform cell selection operation.

In step 2b-13, the terminal performs the first resume procedure operation set 2. The first resume procedure operation set 2 is operations taken before transmitting the ResumeRequest.

<First Resume Procedure Operation Set 2>
0. Restore RRC configurations of UE Inactive AS context except masterCellGroup and PDCP-config.
 1. ResumeMAC-I calculation: Calculate a 16-bit message verification code using the first security key (a security key used in the RRC_CONNECTED state or a security key used at the time of receiving RRC Release).
 2. Deriving the second base station security key using the second base station security key. From the second base station security key, the second security key, the third security key, the fourth security key, and the fifth security key are derived.
 3. All radio bearers except SRB0 are configured to use second security key and third security key or fourth security key and fifth security key.
 3. Reset the PDCP entity of SRB1.
 4. Resume SRB1.

In step 2b-15, the terminal transmits a ResumeRequest message to the second base station. The MAC PDU containing the ResumeRequest message does not include data from other radio bearers. ResumeRequest includes the information below.

<ResumeRequest>
1. The first identifier or the second identifier: an identifier indicated in the system information among the first and second identifiers given in SuspendConfig is included.
2. ResumeMAC-I: 16-bit message verification code to ensure integrity of the resume request message. The terminal calculates the resume MAC-I using the previous security key (a security key used in the RRC_CONNECTED state or a security key used at the time of receiving the RRC Release).

3. resumeCause: Indicating one of emergency, highPriorityAccess, mt-Access, mo-Signalling, mo-Data, mo-VoiceCall, mo-VideoCall, mo-SMS, ma-Update, mps-PriorityAccess, mc s-PriorityAccess and smallDataTransfer The terminal performing the first resume procedure selects one of the remaining values except for smallDataTransfer as the resumeCause. This is to enable the base station to determine whether the second resume procedure is performed through the resumeCause.

In step 2b-17, the terminal receives the RRC Resume. RRCResume includes the following information.

<RRCResume>
1. MasterCellGroup: CellGroupConfig for masterCellGroup includes RLC bearer information, MAC configuration information, PHY configuration information, and SpCell configuration information.
2. RadioBearrConfig: It is radio bearer configuration information and includes SRB configuration information and DRB configuration information.

In step 2b-19, the terminal performs the first resume procedure operation set 3.

<First Resume Procedure Operation Set 3>
1. Stop T319.
2: Stop T380.
3: Restore and apply masterCellGroup of UE Inactive AS Context
4: Apply CellGroupConfig and radioBearerConfig in RRCResume
5. Resume SRB2, SRB3, and all DRBs.
6. Transition to RRC_CONNECTED state.
7. Stop cell reselection procedure.

In step 2b-21, the terminal transmits an RRCResumeComplete message to the second base station. The RRCResumeComplete message includes PLMN identifier information selected by the terminal.

In step 2b-23, the terminal and the second base station transmit and receive data. In this case, the terminal may transmit a MAC CE such as BSR or PHR to the base station together. When the BSR trigger condition is satisfied, the terminal multiplexes the BSR in the uplink MAC PDU and transmit the MAC PDU. When the PHR trigger condition is satisfied, the terminal multiplexes the PHR MAC CE in the uplink MAC PDU and transmit the MAC PDU. BSR trigger conditions include arrival of new data with high priority and expiration of periodic timers. PHR trigger conditions include change of reference signal received power more than a predefined threshold, activation of a new secondary cell, and the like.

In step 2b-25, when data transmission/reception with the terminal is completed, the second base station transmits an RRC Release including SuspendConfig to the terminal to transition the terminal to the RRC_INACTIVE state.

In step 2b-27, the terminal receiving the RRCRelease message including SuspendConfig starts T380.

The second resume procedure is as follows.

In steps 2b-31, the terminal performs the second resume operation set 1. The second resume operation set 1 is operations taken when the second resume procedure is triggered as follows. By performing the second resume operation set 1, the terminal may receive a downlink control message from the base station via the SRB1 and transmit uplink data of the radio bearer (or data transmission in the INACTIVE state, or in which the second resume procedure is configured).

<Second Resume Operation Set 1>
0: Restore all RRC configuration of UE Inactive AS Context (including radio bearer settings of the first set of bearers, masterCellGroup, and PDCP-config).
 1. start T319ext set to t319ext
 2. stop T380
 3. ResumeMAC-I calculation: A 16-bit MAC-I is calculated using the previous K_RRCint, that is, the first security key (K_RRCint used in the previous RRC_CONNECTED state or K_RRCint used at the time of receiving RRCRelease).
 4. Deriving the second base station security key using the first base station security key and the NCC. From the second base station security key, the second security key, the third security key, the fourth security key, and the fifth security key are derived.
 5. Configure the first bearer set to apply the second security key and the third security key or the fourth security key and the fifth security key.
 6. Reset the PDCP entity of the first bearer set.
 7. Resume the radio bearer of the first bearer set.
 8. Stop cell reselection procedure
 9. Start the second cell reselection procedure.

T319ext set to t319ext is a timer to perform follow-up measures, for example, transition to RRC_IDLE, etc., when the second resume procedure fails. T319, T319ext, and T380 have the following characteristics.

TABLE 7

| First reconfiguration | | |
| --- | --- | --- |
| | T380 | T319 |
| Configured by Start | RRCRelease Upon reception of RRCRelease | SIB 1 After start of first reconfiguration procedure, between the time point when configuration received from SIB1 is applied and the time point when SRB1 resumes |
| Stop | Upon reception of RRCResume and before applying cell group configuration | Upon reception of RRCResume and before applying cell group configuration |
| Upon expiration | Initiating periodic RNA update in the current cell | T319 expiry operation set |
| Second reconfiguration | | |
| | T380 | T319ext |
| Configured by Start | RRCRelease Upon reception of RRCRelease | SIB X After start of second reconfiguration procedure, between the time point when SRB1 configuration stored in UE Inactive AS Context is applied and the time point when SRB1 resumes |
| Stop | After start of second reconfiguration procedure, between the time point when SRB1 configuration stored in UE Inactive AS Context is applied and the time point when SRB1 resumes | Upon reception of RRCRelease or before applying cell group configuration |
| Upon expiration | Determining whether to initiate periodic RNA update in the current cell | T319ext expiry operation set |

In the first resume procedure, T380 and T319 stops before configuring cell group information after receiving the RRCResume message to prevent unnecessary subsequent operation due to the timer expiration by stopping the timers as a first operation after receiving the RRCResume message.

In the first resume procedure, starting T319 between the time point when the default SRB1 configuration is applied and the time point when SRB1 resumes is to start T319 as close as possible to the time point when SRB1 becomes available.

In the second resume procedure, starting T319ext between the time point when SRB1 configuration stored in UE Inactive AS Context is applied and the time point when SRB1 resumes is to start T319ext as close as possible to the time point when SRB1 becomes available.

In the second resume procedure, starting T380 between the time point when SRB1 configuration stored in UE Inactive AS Context is applied and the time point when SRB1 resumes is to start T380 as close as possible to the time point when T319ext starts so that the processing load for timer handling in UE is reduced.

The time point when SRB1 configuration stored in UE Inactive AS Context is applied and the time point when radio bearer configuration for first bearer set stored in UE Inactive AS Context is applied are same.

If the RRCResume is not received until the T319ext set to t319ext expires, the terminal may perform the T319ext expiration operation set or the T319 expiration operation set. The base station may set in SuspendConfig or in system information which one to select between the T319ext expiration operation set and the T319 expiration operation set.

<T319ext Expiration Operation Set>
 1. Reset MAC
 2. Keep UE Inactive AS Context
 3. Keep suspendConfig
 4. Discard first base station security key and first security key in UE and store second base station security key and third security key
 5. Suspend all SRBs and DRBs
 6. Start T380 set to t380
 7. Stop second cell reselection procedure
 8. Start cell reselection procedure
 9. Perform RNA update after selecting a suitable cell The first bearer set is a set of radio bearers for which the second resume procedure is explicitly or implicitly configured and consists of SRB1 and radio bearers related to the second resume procedure. The radio bearer related to the second resume procedure refers to a radio bearer in which the second resume procedure is explicitly allowed or a radio bearer in which the second resume procedure is explicitly configured.

Stopping the cell reselection procedure means stopping the existing cell reselection procedure performed before the second resume procedure starts.

UE preferentially selects, in the existing cell reselection procedure, a frequency to camp on by considering cell reselection priority provided by base station, ranks each cell of the selected frequency by considering reference signal received power and various offsets, and reselects a highest ranked cell.

When the second cell reselection procedure starts, the terminal stops using the cell reselection priority and offsets indicated by the base station and uses the following parameters.

<Second Cell Reselection Procedure>

1. Increase the cell reselection priority of the current serving frequency to the highest priority.
2. Increase the first Qhyst by a predetermined value. Or apply the 2nd Qhyst.

When the terminal determines the cell ranking, the current serving cell is weighted by Qhyst. That is, the ranking is determined by adding Qhyst to the reference signal received power of the current serving cell. The first Qhyst is included in the SIB2 and broadcasted. The second Qhyst or the predetermined value is included in the SIBX and broadcasted.

In steps 2b-33, the terminal transmits a MAC PDU including a first SDU including a ResumeRequest message and data of first bearer set (or data of a bearer in which a second resume procedure is configured) to the second base station. The terminal performing the second resume procedure selects smallDataTransfer as ResumeCause. The terminal may include a priority-based BSR MAC CE and a PHR MAC CE in the MAC PDU. If the BSR/PHR inclusion condition is satisfied and the BSR/PHR cancellation condition is not satisfied, the terminal includes and transmits the priority-based BSR MAC CE and the PHR MAC CE in the MAC PDU. The terminal transmits MAC PDUs that do not include the priority-based BSR and PHR when the BSR/PHR cancellation condition is satisfied even if the BSR/PHR inclusion condition is satisfied.

<BSR/PHR Inclusion Condition>

There is more data for transmission after transmission of the MAC PDU (or first uplink MAC PDU of the second resume procedure) including ResumeRequest, or uplink grant (or first uplink grant of the second resume procedure) for transmission of MAC PDU including ResumeRequest does not accommodate all pending data available for transmission.

<BSR/PHR Cancellation Condition>

An uplink grant (or the first uplink grant of the second resume procedure) for transmission of MAC PDU including ResumeRequest can accommodate all pending data available for transmission if at least one of a triggered BSR and corresponding subheader or a triggered PHR are not included in the MAC PDU but cannot accommodate all pending data available for transmission if both tirggered BSR and corresponding subheader and triggered PHR and corresponding PHR are included in the MAC PDU.

In steps 2b-35, the terminal and the base station transmit and receive data of the first bearer set. Data of the first bearer set is scheduled by C-RNTI, and the terminal monitors a frequency region and a time interval, indicated in SIBX, for transmitting and receiving small amounts of data (or for transmitting and receiving data in the second resume procedure).

When the data transmission is completed, the base station determines to terminate the second resume procedure.

In steps 2b-37, the second base station transmits an RRCRelease including SuspendConfig to the terminal to terminate the second resume procedure. When receiving an RRCRelease including SuspendConfig, the terminal performs the second resume procedure operation set 2 to terminate the second resume procedure.

<Second Resume Operation Set 2>

Figure 2C:
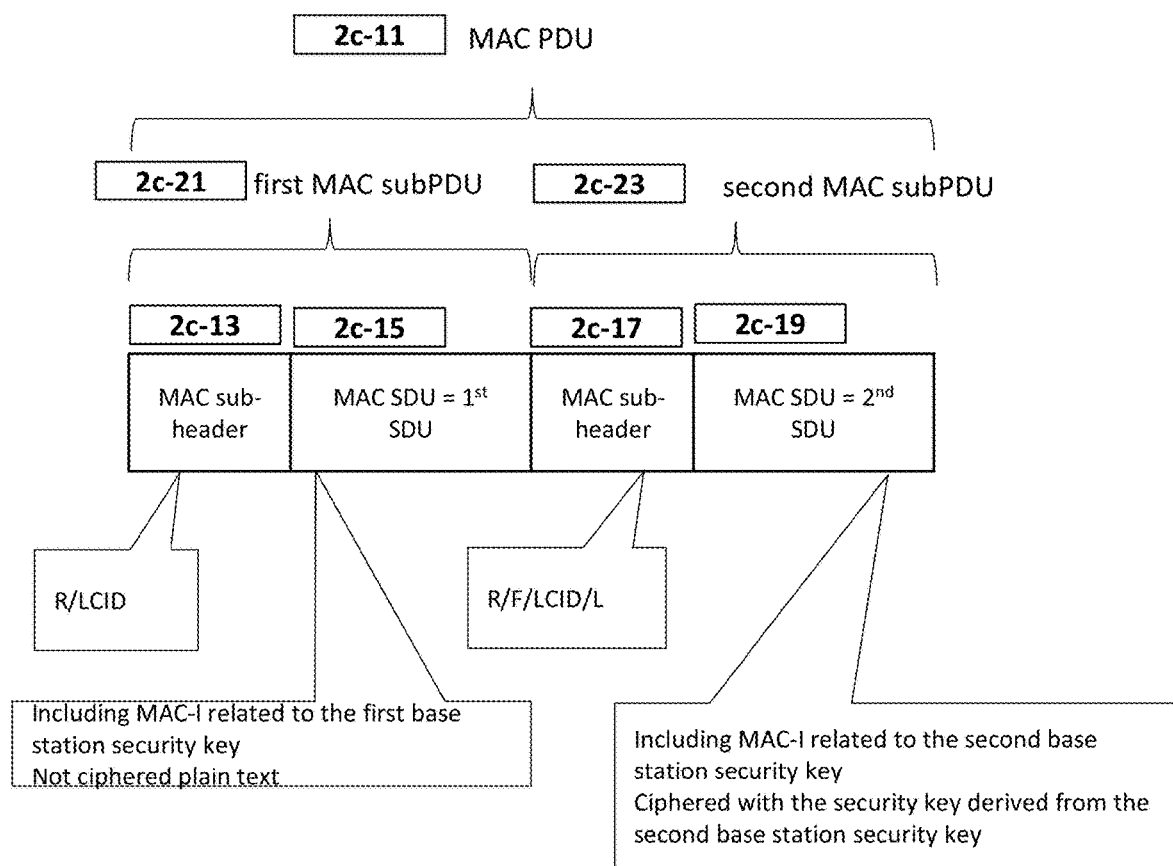
FIG. 2C is a diagram illustrating a structure of an uplink MAC PDU used in a second resume procedure.

1. Stop monitoring frequency region and time interval for small data transmission indicated in SIB X 2. Reset MAC
3. Update suspendConfig
4. Discard first base station security key and first security key in UE and store second base station security key and third security key
5. Suspend all SRBs and DRBs except SRB0
6. Start T380 set to t380
7. Stop second cell reselection procedure
8. Start cell reselection procedure FIG. 2C is a diagram illustrating a structure of an uplink MAC PDU used in a second resume procedure.

The MAC SDU (first SDU) 2c-15 including the ResumeRequest message is located at the front of the MAC PDU 2c-11 and the MAC SDU (second SDU) 2c-19 including the data of the first bearer set (data of the bearer where second resume procedure is configured) is located at the rear of the MAC PDU. This is to enable the base station receiving the MAC PDU to recognize as quickly as possible that the MAC PDU is a MAC PDU related to the second resume procedure. The first SDU includes a part of the MAC-I calculated by the first security key (K_RRCint previously used), and the second SDU includes a MAC-I calculated by the fifth security key (new K_UPenc derived from the second base station security key). The MAC sub-header 2c-13 of the first SDU includes two R bits and an LCID field, and the MAC sub-header 2c-17 of the second SDU includes one R bit, an F field, an LCID field, and an L field. The LCID field indicates which logical channel the corresponding MAC SDU belongs to or which MAC CE is the corresponding MAC CE, and the L field indicates how many bytes the corresponding MAC SDU or MAC CE is. A MAC SDU or MAC CE and corresponding MAC subheader is referred to as a MAC subPDU. The MAC PDU 2c-11 shown in 2c includes two MAC subPDUs 2c-21 and 2c-23. Hereinafter, a structure of the MAC PDU shown in FIG. 2C is referred to as a MAC PDU structure 1. MAC PDU structure 1 is characterized in that a MAC subPDU including a MAC SDU and having an R/LCID subheader locates in front of a MAC subPDU including a MAC SDU and having R/F/LCID/F. This feature allows the base station to process the ResumeRequest message as soon as possible, as described above.

Figure 2D:
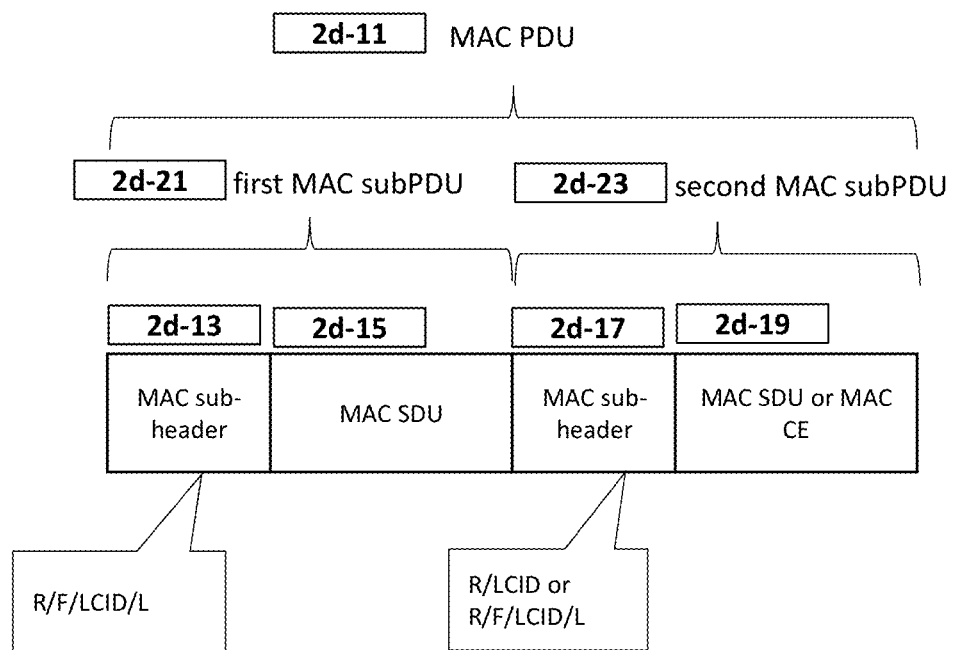
FIG. 2D is a diagram illustrating a structure of a general uplink MAC PDU.

FIG. 2D is a diagram illustrating a structure of a general uplink MAC PDU. Although a MAC PDU including two MAC subPDUs is exemplified, one MAC PDU may include two or more MAC subPDUs. Hereinafter, a structure of the MAC PDU shown in FIG. 2d is referred to as a MAC PDU structure 2. In MAC PDU structure 2, a MAC subPDU having an R/LCID subheader is located behind a MAC subPDU including a MAC SDU with an R/F/LCID/F subheader. MAC subPDUs with R/LCID subheaders correspond to MAC CE in most cases, and by placing MAC subPDUs including MAC CE behind MAC subPDUs including MAC SDUs, the terminal can process MAC subPDUs including MAC SDUs in advance before receiving uplink grant.

The first SDU 2c-15 is a first RRC control message received by the base station. Therefore, the base station and the terminal need to process the first SDU by applying the same configuration without prior consultation. On the other hand, the second SDU 2c-20 may be processed after the base station processes the first SDU and may be processed after the base station restores the UE Inactive AS Context. Accordingly, the second SDU may be processed according to the configuration stored in UE Inactive AS Context.

In the present invention, a first configuration is applied to the first SDU and a second configuration is applied to the second SDU. The first configuration refers to a configuration predetermined in the standard (or a configuration standardized with one value), and the second configuration refers to a configuration stored in the UE Inactive AS Context. Usually, one MAC PDU includes only the MAC SDU to which the first configuration is applied or only the MAC SDU to which the second configuration is applied, but in the present invention, the MAC SDU to which the first configuration is applied and the MAC SDU to which the second configuration is applied are transmitted together in a single MAC PDU. This is to more quickly transmit the MAC SDU to which the second configuration is applied.

The first configuration and the second configuration may include at least PDCP configuration, RLC configuration, and logical channel configuration. The PDCP configuration of the first configuration is PDCP unused, the RLC configuration of the first configuration is RLCTM, the logical channel configuration of the first configuration is the highest priority, LCG ID 0, LCID 0, etc. Alternatively, the first configuration may be a default SRB1 configuration.

The second configuration of a bearer where the second resume procedure is configured is as follows. The PDCP configuration is the PDCP configuration of the corresponding bearer stored in the UE Inactive AS Context, the RLC configuration is the RLC configuration of the RLC bearer associated with the corresponding bearer stored in the UE Inactive AS Context (e.g., various timer values), and the logical channel configuration is the RLC bearer's logical channel configuration. The terminal applies, to the PDCP configuration and the RLC configuration, the configuration stored in the UE Inactive AS Context as it is. The terminal applies, to the logical channel configuration, only some of the configurations stored in the UE Inactive AS Context and does not apply the rest as if they were not configured. The logical channel configuration of the radio bearer belonging to the first bearer set consists of an LCID, an LCG ID, a priority, and various restriction-related configurations. In transmitting data of the first bearer set during the second resume procedure, the terminal uses stored values and processes various restriction-related configurations as if they were not configured. Various restriction-related configurations include, for example, allowedServingCells, allowedSCS-List, and maxPUSCH-Duration. If this restriction-related configuration is not configured, the terminal determines that there is no restriction on the corresponding logical channel in transmitting and receiving data of the logical channel. The stored restriction-related configuration may be applied when the first resume procedure is initiated.

When the first SDU 2c-15 and the second SDU 2c-19 are multiplexed in one MAC PDU during the second resume procedure, the terminal applies a predefined configuration for the first SDU, that is, PDCP not used, RLC TM, highest priority, LCID0 and LCG ID0. The terminal applies, to the second SDU, overall PDCP configuration of the corresponding bearer, overall RLC configuration of the RLC bearer of the corresponding bearer and some of logical channel configuration of the RLC bearer of the corresponding bearer stored in UE Inactive AS Context and does not apply the rest of logical channel configuration of the RLC bearer of the corresponding bearer. The applied logical channel configuration may be an LCID, a priority and an LCG ID, and the non-applied logical channel configuration may be allowedServingCells, allowedSCS-List, maxPUSCH-Duration, and the like.

The terminal generates SDU1 by applying the first configuration, and generates SDU2 by applying the second configuration.

The uplink MAC PDU may include a MAC SDU or a MAC CE. The MAC CE collectively refers to control information generated and transmitted by a MAC layer such as BSR or PHR. MAC CE may have a fixed size or a variable size. The field L is not used for the MAC subheader of the MAC CE having a fixed size. A general MAC SDU has a variable size and an L field is used for a corresponding sub header. The MAC subPDU including the MAC CE is always located behind the MAC subPDU including the MAC SDU. Therefore, in a general uplink MAC PDU in which at least two MAC subPDUs are multiplexed, a MAC subPDU having an L field is located in front and a MAC subPDU having no L field is located in rear. In general, all MAC SDUs included in one uplink MAC PDU are protected by a security key derived from the same base station security key.

Figure 2E:
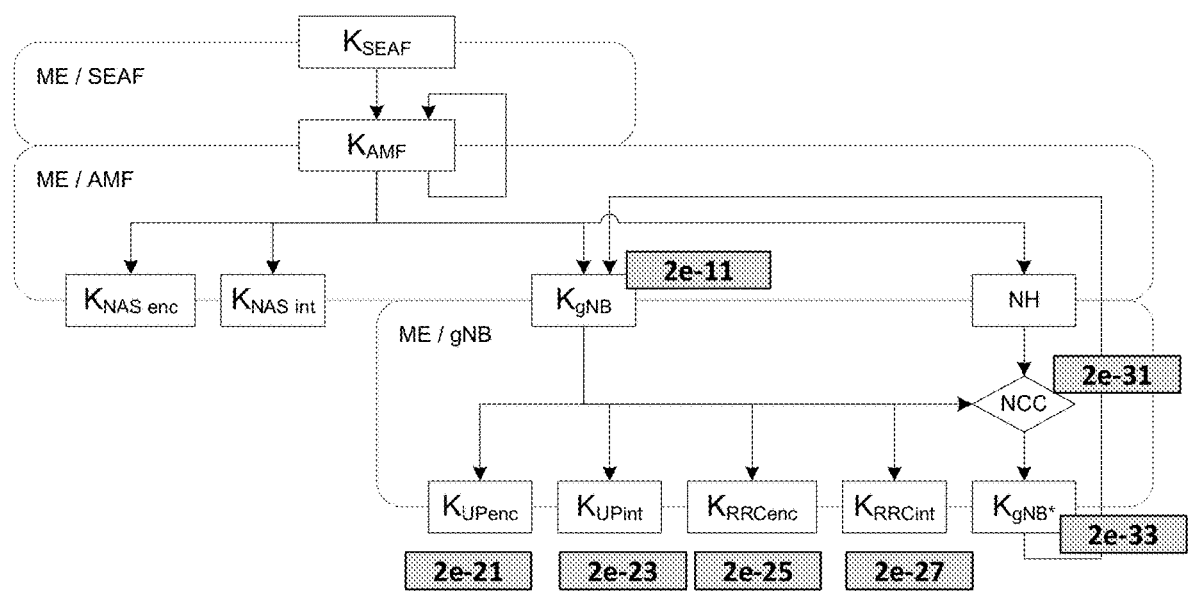
FIG. 2E is a diagram illustrating a hierarchical structure of security keys.

FIG. 2E is a diagram illustrating a hierarchical structure of security keys.

The terminal and the base station perform integrity protection and ciphering using security keys derived from the KgNB 2e-11. Four sub-security keys, K_UPenc 2e-21, K_UPint 2e-23, K_RRCenc 2e-25 and K_RRCint 2e-27 are derived from KgNB 2e-21. KgNB derives KgNB* 2e-33 by inputting NCC 2e-31 or the like during a handover or resume procedure, and new sub-security keys are derived from the KgNB*.

In FIG. 2C, the first SDU 2c-15 is integrity protected by K_RRCint derived from KgNB used in the previous cell, that is, at least a part of the MAC-I calculated by the K_RRCint is included in the first SDU and transmitted together, and the second SDU(2c-19)is integrity protected by K_UPint and ciphered by K_UPenc among sub-security keys of KgNB* derived from NCC and KgNB used in the previous cell.

That is, some of the MAC SDUs included in one MAC PDU during the second resume process are protected by a security key derived from KgNB, and the other MAC SDU is protected by a security key derived from KgNB*.

MAC SDUs multiplexed in the MAC PDU 2d-11 of FIG. 2d are ciphered or integrity protected by a sub-security key derived from one of KgNB and KgNB*.

KgNB previously used or used at the time of receiving RRCRelease is the first base station security key. K_RRCint derived from the first base station security key is the first security key. KgNB* (or derived from the first base station security key and NCC or KgNB derived from the second resume procedure operation set 1) is the second base station security key. K_RRCenc, K_RRCint, K_UPenc and K_UPint derived from the second security key are denoted as the second security key, the third security key, the fourth security key and fifth security key.

Conventionally, one MAC PDU is ciphered or integrity protected with security keys derived from one base station security key. In the present invention, by multiplexing MAC SDUs protected with security keys derived from different base station security keys into one MAC PDU, the MAC SDUs are transmitted more quickly.

Figure 2F:
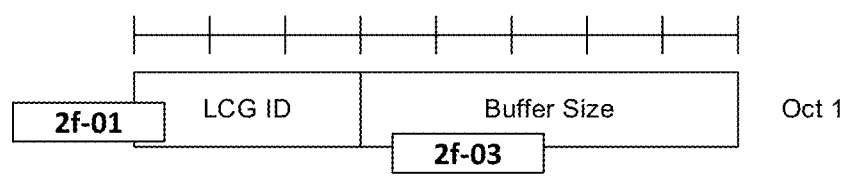
FIG. 2F is a diagram illustrating structures of a first BSR MAC CE and a second BSR MAC CE.
Figure 2F:
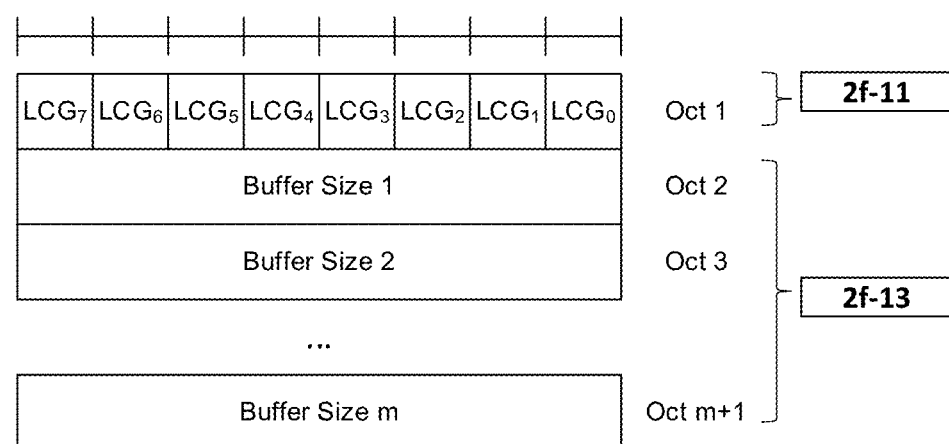
Figure 2G:
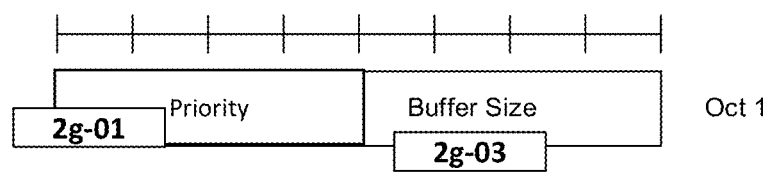
FIG. 2G is a diagram illustrating structures of a third BSR MAC CE and a fourth BSR MAC CE.
Figure 2G:
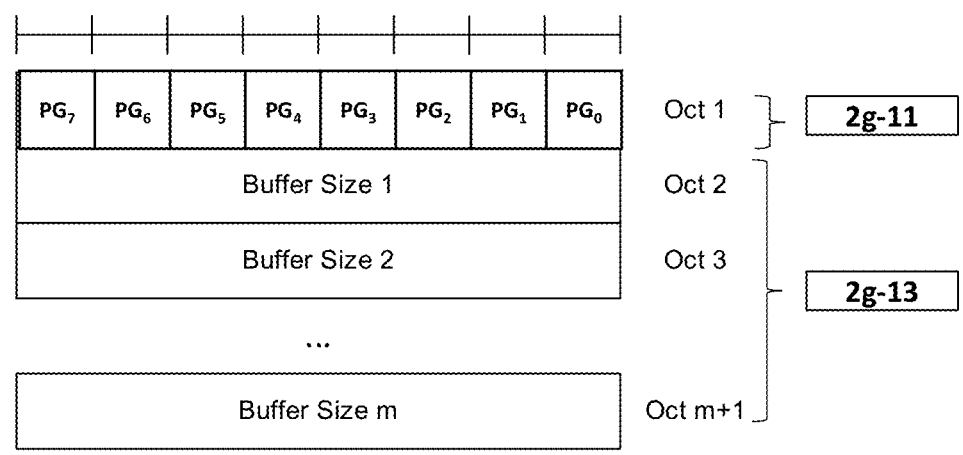
Figure 2H:
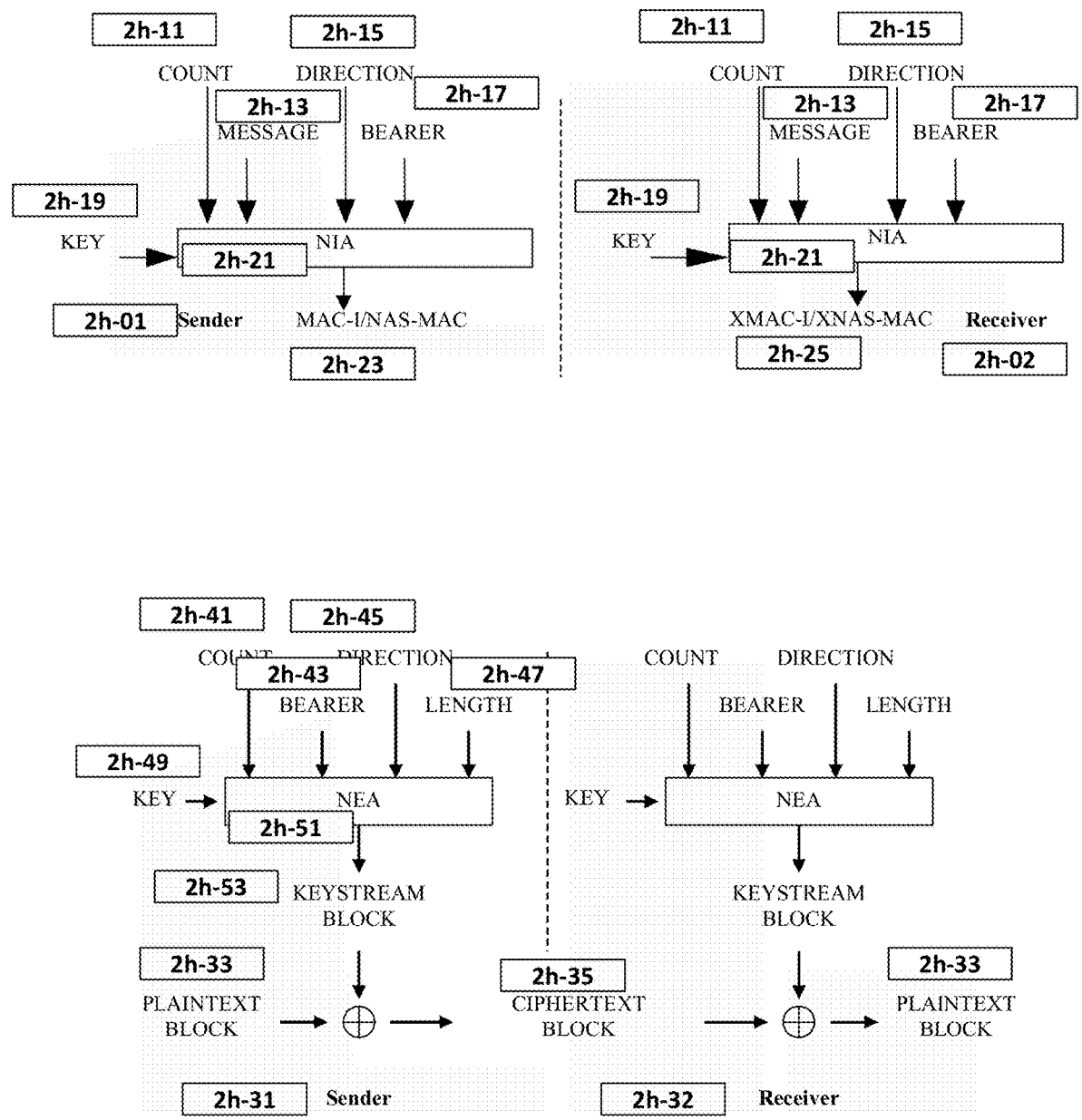
FIG. 2H is a diagram illustrating a MAC-I calculation process and ciphering process.

FIG. 2h is a diagram illustrating a MAC-I calculation process and ciphering process.

The transmitting end 2h-01 generates MAC-I and transmits the MAC-I to the receiving end 2h-02. The transmitting end generates MAC-I 2h-23 by inputting the security key 2h-19, COUNT 2h-11, message 2h-13, DIRECTION 2h-15, and BEARER 2h-17 into the NIA (NR Integrity Algorithm) 2h-21 and transmits the generated MAC-I 2h-23 to the receiving end.

The receiving end also calculates XMAC-I 2h-25 by inputting the security key 2h-19, COUNT 2h-11, message 2h-13, DIRECTION 2h-15, and BEARER 2h-17 into the NR integrity algorithm (NIA) 2h-21, and determines if the received MAC-I is the same. MAC-I and XMAC-I may be the same only when the same NR integrity algorithm (NIA) 2h-21, the same security key 2h-19, the same COUNT 2h-11, the same message 2h-13, the same DIRECTION 2h-15, and the same BEARER 2h-17 are used at the transmitting end and receiving ends. MAC-I has a 32-bit size.

MAC-I included in the first SDU 2c-15 of the uplink MAC PDU 2c-11 of the second resume process is the last 16 bits of MAC-I calculated using a first security key, a COUNT set to all 0s, a DIRECTION set to 0 and a message consisting of an identifier of a terminal and an identifier of a cell.

The MAC-I included in the second SDU 2c-19 of the uplink MAC PDU (2c-11) of the second resume process is for a PDCP SDU belonging to the first bearer set, and is calculated using a fifth security key, a COUNT of the PDCP SDU, a DIRECTION set to 0, and a DRB identifier, and a message that is the PDCP SDU.

The transmitting end 2h-31 processes a simple text to a ciphered block as follows and transmits the same to the receiving end 2h-32. The transmitting end generates a keystream block 2h-53 by inputting a security key 2h-49, a COUNT 2h-41, a BEARER 2h-43, a DIRECTION 2h-45, and a LENGTH 2h-47 into the NR Encryption Algorithm (NEA) 2h-51. The transmitting end generates a ciphered block 2h-35 by applying exclusively OR calculation to the generated keystream block with simple text 2h-33, and transmits the generated ciphered block to the receiving end. The LENGTH is the length of the simple text.

The receiving end inversely converts the received ciphered block into simple text using the same input and the same security key.

The second SDU 2c-19 of the uplink MAC PDU 2c-11 of the second resume process may include a ciphered PDCP SDU of the first bearer set. The PDCP SDU is ciphered using a fourth security key, a COUNT of the PDCP SDU, a DIRECTION set to 0, a DRB identifier BEARER, and a PDCP SDU length LENGTH.

FIG. 2F is a diagram illustrating structures of a first BSR MAC CE and a second BSR MAC CE, which are BSR based on a logical channel group.

The first BSR MAC CE includes one logical channel group identifier field 2f-01 and one first buffer size field 2f-03. The logical channel group identifier field 2f-01 has a size of 3 bits and indicates one of the logical channel group identifiers between 0 and 7. The first buffer size field 2f-03 has a 5-bit size and indicates one of the first buffer size indexes between 0 and 31. The first buffer size index 0 means that there is no data available for transmission in the logical channels belonging to the corresponding logical channel group. The first buffer size index 31 means that the sum of data available for transmission of the logical channels belonging to the corresponding logical channel group is greater than the 30th first buffer size. The first buffer size index 1 means that sum of data available for transmission of the logical channels belonging to the corresponding logical channel group is greater than 0 and less than or equal to the first buffer size. The first buffer size index n (2<=n<=30) indicates that sum of data available for transmission of the logical channels belonging to the corresponding logical channel group is greater than or equal to the n−1th first buffer size and less than or equal to the nth first buffer size. The 30 first buffer sizes are defined in the standard.

The second BSR MAC CE includes eight LCGi bits 2f-11 and a plurality of second buffer size fields 2f-13. The LCGi bit indicates whether a second buffer size field exists for the logical channel group i. For example, it indicates whether a second buffer size field exists for LCG1 logical channel group 1. If this field is 1, a second buffer size field exists for the corresponding LCG. The second buffer size field has an 8-bit size and indicates one of the second buffer size indexes between 0 and 255. The second buffer size index 0 means that there is no data available for transmission in the logical channels belonging to the corresponding logical channel group. The second buffer size index 254 means that the sum of data available for transmission of the logical channels belonging to the corresponding logical channel group is greater than the 253rd second buffer size. The second buffer size index 1 means that sum of data available for transmission of the logical channels belonging to the corresponding logical channel group is greater than 0 and less than or equal to the first second buffer size. The second buffer size index n (2<=n<=253) indicates that the sum of data available for transmission of the logical channels belonging to the corresponding logical channel group is greater than or equal to the n−1th second buffer size and less than or equal to the nth second buffer size. The second buffer size index 255 is not used. The 252 second buffer sizes are defined in the standard.

The logical channel group is configured when the logical channel is configured. The logical channel and the logical channel group are configured by RRC control messages.

FIG. 2G is a diagram illustrating structures of a third BSR MAC CE and a fourth BSR MAC CE, which are priority-based BSRs. The third BSR MAC CE includes one priority identifier field 2g-01 and one third buffer size field 2g-03. The priority identifier field has a size of 4 bits. The priority identifier field indicates one value between 0 and 15, which corresponds one-on-one to the logical channel priority between 1 and 16. That is, adding 1 to the value of the priority identifier field is equal to the actual priority. For example, the priority identifier field 0000 means priority 1, 0001 means priority 2, and 1111 means priority 16. The third buffer size field indicates a third buffer size index between 0 and 15 with a 4-bit size. Unlike the first buffer size index 0 or the second buffer size index 0, the third buffer size index 0 means that the sum of data available for transmission of the logical channels having a corresponding priority is equal to or greater than 0 and smaller than the first third buffer size. The third buffer size index n (2<=n<=14) indicates that the sum of data available for transmission of the logical channels having a corresponding priority is greater than or equal to the n−1th third buffer size and less than or equal to the nth third buffer size. The third buffer size index 15 means that the sum of data available for transmission of the logical channels having a corresponding priority is greater than the 15th third buffer size. The first buffer sizes, the second buffer sizes, and the third buffer sizes are predefined in the specification. The 15 third buffer sizes are defined in the standard.

The fourth BSR MAC CE includes PGi bits and a plurality of second buffer size fields.

PGi indicates whether a second buffer size field of the priority group identifier i exists. The priority group consists of at least one priority, and eight groups could be configured from priority group 0 to priority group 7 in one cell. The priority for each logical channel is configured by a predetermined RRC control message received from the first NR cell, and the mapping relationship between the priority and the priority group is configured by a predetermined system information received from the second NR cell. The system information may be SIBX. For example, a list of priorities mapped per priority group may be broadcast through the SIBX.

Figure 3:
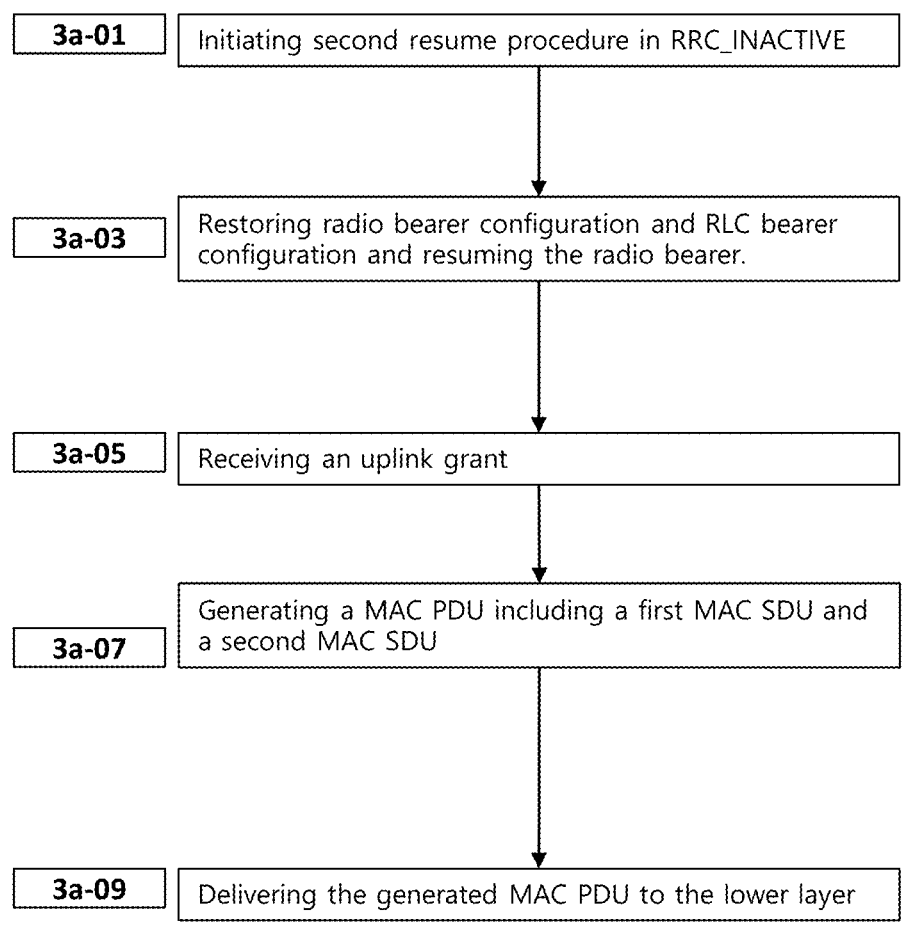
FIG. 3 is a flow diagram illustrating an operation of a terminal.

FIG. 3 is a flow diagram illustrating an operation of a terminal.

In step 3a-01, the UE in the RRC_INACTIVE state initiates the second resumption procedure. The UE may initiate the second resume procedure when all of the second resume condition sets are satisfied.

In step 3a-03, the UE restores the radio bearer configuration and RLC bearer configuration of a specific data radio bearer belonging to the first bearer group stored in the UE Inactive AS Context and resumes the bearer.

In step 3a-05, the UE initiates the second resumption procedure and then receives the first uplink grant. The uplink grant may be received as part of a random access response message during the random access procedure or in downlink control information during the second process. Alternatively, it may be a configured grant given in advance in SuspendConfig. The uplink grant includes the size of an uplink MAC PDU to be transmitted by the UE, transmission resources to be used when transmitting the MAC PDU, and coding information.

In step 3a-07, the UE generates a MAC PDU. The MAC PDU includes a first MAC subheader, a first MAC SDU including a first uplink control message, a second MAC subheader, and a second MAC SDU including data of the data radio bearer. The first MAC subheader is located immediately before the first MAC SDU, the first MAC SDU is located immediately before the second MAC subheader, and the second MAC subheader is located immediately before the second MAC SDU. The first uplink control message includes the UE identifier and resume reason information.

A common control logical channel configuration predetermined in the standard is applied to the first MAC SDU. Common logical channel configuration includes PDCP configuration, RLC configuration and logical channel configuration and is as follows.

TABLE 8

| Name | Value |
|---|---|
| PDCP configuration | Not used |
| RLC configuration | TM |
| Logical channel configuration | |
| >priority | 1 |
| >prioritisedBitRate | infinity |
| >bucketSizeDuration | ms1000 |
| >logicalChannelGroup | 0 |

In the first MAC SDU, PDCP SDUs to which neither the PDCP header nor the RLC header are added are contained according to the configuration of the common control logical channel. The first MAC SDU is given the highest priority according to the configuration of the common control logical channel.

The PDCP configuration and RLC configuration of the data radio bearer stored in the UE Inactive AS Context are applied to the second MAC SDU, and a priority and a logical channel identifier among logical channel configurations are applied. Various type of restriction configuration such as allowedServingCells in logical channel configuration of the data radio bearer is not applied to the second MAC SDU.

The common control logical channel configuration predefined in the standard is applied to the first MAC SDU, and the logical channel identifier and priority among the logical channel configurations stored in the UE context are applied to the second MAC SDU, and the allowed serving cell list is not applied.

In step 3a-09, the UE delivers the uplink MAC PDU including the MAC SDU generated by applying the predefined configuration and the MAC SDU generated by applying the configuration stored in the UE context to the lower layer. The MAC PDU is transmitted by a lower layer.

the MAC SDU generated by applying the predefined configuration is located before the MAC SDU generated by applying the configuration stored in the UE context.

The MAC SDU generated by applying the predefined configurations is protected by a security key derived from the security key of the first base station, and the MAC SDU generated by applying the configurations stored in the UE context is protected by the security key derived from the security key of the second base station. Protected by keys.

The MAC subheader of the MAC SDU generated by applying the predefined configuration is composed of R bits and an LCID field. The MAC subheader of the MAC SDU generated by applying the configuration stored in the UE context is composed of R bits, F fields, LCID fields, and L fields.

Figure 4A:
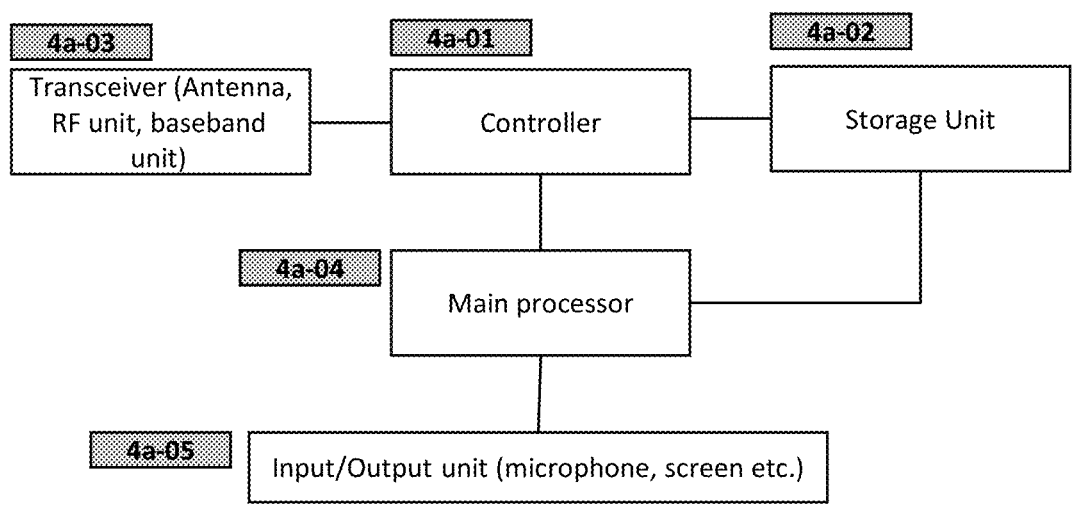
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4a-01, a storage unit 4a-02, a transceiver 4a-03, a main processor 4a-04 and I/O unit 4a-05.

The controller 4a-01 controls the overall operations of the UE in terms of mobile communication. For example, the controller 4a-01 receives/transmits signals through the transceiver 4a-03. In addition, the controller 4a-01 records and reads data in the storage unit 4a-02. To this end, the controller 4a-01 includes at least one processor. For example, the controller 4a-01 may include a communication processor (CP) that performs control for communication and an application processor (AP) that controls the upper layer, such as an application program. The controller controls storage unit and transceiver such that UE operations illustrated in FIG. 2A and FIG. 2B and FIG. 3 are performed.

The storage unit 4a-02 stores data for operation of the UE, such as a basic program, an application program, and configuration information. The storage unit 4a-02 provides stored data at a request of the controller 4a-01.

The transceiver 4a-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi 10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4a-04 controls the overall operations other than mobile operation. The main processor 4a-04 process user input received from I/O unit 4a-05, stores data in the storage unit 4a-02, controls the controller 4a-01 for required mobile communication operations and forward user data to I/O unit (905).

I/O unit 4a-05 consists of equipment for inputting user data and for outputting user data such as a microphone and a screen. I/O unit 4a-05 performs inputting and outputting user data based on the main processor's instruction.

Figure 4B:
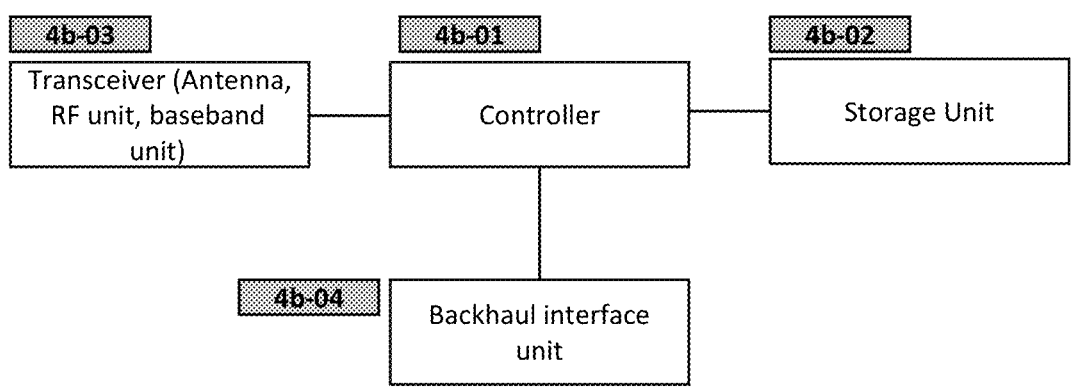
FIG. 4B is a block diagram illustrating the configuration of a base station according to the disclosure.

FIG. 4b is a block diagram illustrating the configuration of a base station according to the disclosure.

As illustrated in the diagram, the base station includes a controller 4b-01, a storage unit 4b-02, a transceiver 4b-03 and a backhaul interface unit 4b-04.

The controller 4b-01 controls the overall operations of the main base station. For example, the controller 4b-01 receives/transmits signals through the transceiver 4b-03, or through the backhaul interface unit 4b-04. In addition, the controller 4b-01 records and reads data in the storage unit 4b-02. To this end, the controller 4b-01 may include at least one processor. The controller controls transceiver, storage unit and backhaul interface such that base station operation illustrated in FIG. 2A and FIG. 2B are performed.

The storage unit 4b-02 stores data for operation of the main base station, such as a basic program, an application program, and configuration information. Particularly, the storage unit 4b-02 may store information regarding a bearer allocated to an accessed UE, a measurement result reported from the accessed UE, and the like. In addition, the storage unit 4b-02 may store information serving as a criterion to deter mine whether to provide the UE with multi-connection or to discontinue the same. In addition, the storage unit 4b-02 provides stored data at a request of the controller 4b-01.

The transceiver 4b-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi 10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4b-04 provides an interface for communicating with other nodes inside the network. The backhaul interface unit 4b-04 converts a bit string transmitted from the base station to another node, for example, another base station or a core network, into a physical signal, and converts a physical signal received from the other node into a bit string.

What is claimed is:

1. A method performed by a terminal, the method comprising:
   receiving from a base station a first Radio Resource Control (RRC) message, wherein the first RRC message comprises a set of parameters for RRC_INACTIVE state;
   storing RRC configuration in User Equipment (UE) context, wherein the RRC configuration comprises a first security key and a second security key;
   transitioning to the RRC_INACTIVE state;
   receiving from the base station a system information;
   determining to initiate a second resume procedure based on the set of parameters for the RRC_INACTIVE state and the system information;
   restoring a first configuration from the UE context, wherein the first configuration comprises a Packet Data Convergence Protocol (PDCP) configuration and a bearer configuration;
   reestablishing PDCP entity:
   transmitting to the base station a second RRC message, wherein the second RRC message comprises a specific part of a Message Authentication Code, wherein the Message Authentication Code is calculated based on:
   the second security key;
   a cell identifier; and
   a terminal identifier;
   performing with the base station data transfer in the RRC_INACTIVE state based on:
   a third security key;
   a fourth security key; and
   the first configuration;
   receiving from the base station a third RRC message; and
   terminating the second resume procedure.

2. The method of claim 1,
   wherein the set of parameters for the RRC_INACTIVE state comprises:
   a Signaling Radio Bearer2 (SRB2) indicator; and
   a Data Radio Bearer (DRB) list.

3. The method of claim 1,
   wherein the set of parameters for the RRC_INACTIVE state further comprises a NextHopChaningCount (NCC).

4. The method of claim 1,
   wherein the RRC configuration further comprises a masterCellGroup.

5. The method of claim 1,
   wherein the system information comprises:
   a first threshold for a reference signal received power; and
   a second threshold for a data volume.

6. The method of claim 1,
   wherein the second resume procedure is resumed in case that:
   the uplink data occurs in a radio bearer configured for the second resume procedure;
   a reference signal received power is greater than a first threshold; and
   a data volume of the uplink data is smaller than a second threshold.

7. The method of claim 6,
   wherein the radio bearer configured for the second resume procedure is determined based on:
   a SRB2 indicator; and
   a DRB list.

8. The method of claim 1,
wherein:
the third security key is derived from the first security key and an NCC; and
the fourth security key is derived from the second security key and the NCC.

9. The method of claim 1,
wherein:
the third security key is a base station specific security key; and
the fourth security key is for integrity protection.

10. The method of claim 1,
wherein the restoring the first configuration from the UE context is performed after the transmitting the second RRC message in case that a first resume procedure is initiated based on the determination.

11. The method of claim 10,
wherein the first resume procedure causes state transition to RRC_CONNECTED state.

12. The method of claim 1,
wherein:
the second RRC message is RRCResumeRequest; and
the third RRC message is RRCRelease.

13. A terminal in a wireless communication system, the terminal comprising:
a transceiver configured to transmit and receive a signal; and
a controller configured to control the transceiver to:
receive from a base station a first Radio Resource Control (RRC) message, wherein the first RRC message comprises a set of parameters for RRC_INACTIVE state;
store RRC configuration in User Equipment (UE) context, wherein the RRC configuration comprises a first security key and a second security key;
transition to the RRC_INACTIVE state;
receive from the base station a system information;
determine to initiate a second resume procedure based on the set of parameters for the RRC_INACTIVE state and the system information;
restore a first configuration from the UE context, wherein the first configuration comprises a Packet Data Convergence Protocol (PDCP) configuration and a bearer configuration;
reestablish PDCP entity,
transmit to the base station a second RRC message, wherein the second RRC message comprises a part of a Message Authentication Code, wherein the Message Authentication Code is calculated based on:
the second security key;
a cell identifier; and
a terminal identifier;
perform with the base station data transfer in the RRC INACTIVE state based on:
a third security key;
a fourth security key; and
the first configuration;
receive from the base station a third RRC message; and
terminate the second resume procedure.

14. A method performed by a base station, the method comprising:
transmitting to a terminal a first Radio Resource Control (RRC) message, wherein the first RRC message comprises a set of parameters for RRC_INACTIVE state, wherein the set of parameters for the RRC_INACTIVE state comprises a NextHopChanningCount (NCC);
storing RRC configuration in User Equipment (UE) context, wherein the RRC configuration comprises a first security key and a second security key;
receiving from the terminal a Medium Access Control (MAC) Protocol Data Unit (PDU), wherein the MAC PDU comprises a second RRC message and a Service Data Unit (SDU), wherein a predefined configuration is applied to the second RRC message, wherein the predefined configuration comprises Transparent Mode (TM) Radio Link Control (RLC) configuration, wherein a bearer configuration and a PDCP configuration restored from the UE context are applied to the SDU, wherein the second RRC message comprises a part of Message Authentication Code calculated based on:
the second security key;
a cell identifier; and
a terminal identifier; and
performing with the terminal data transfer in the RRC_INACTIVE state during a second resume procedure based on:
a third security key;
a fourth security key;
the PDCP configuration; and
the bearer configuration,
wherein the third security key is derived from the first security key and the NCC,
wherein the fourth security key is derived from the second security key and the NCC,
wherein when the data transfer with the terminal in the RRC_INACTIVE state ends:
the first security key and the second security key are deleted in the UE context; and
the third security key and the fourth security key are stored in the UE context.

* * * * *